(12) United States Patent
Cho et al.

(10) Patent No.: US 11,573,358 B2
(45) Date of Patent: Feb. 7, 2023

(54) POLARIZING PLATE AND OPTICAL DISPLAY DEVICE COMPRISING SAME

(71) Applicant: Samsung SDI Co., Ltd., Yongin-si (KR)

(72) Inventors: Sung Man Cho, Suwon-si (KR); Yeon Ju Na, Suwon-si (KR); Eun Sol Cho, Suwon-si (KR); Mun Bo Ko, Suwon-si (KR); Ki Yong Kim, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 16/764,357

(22) PCT Filed: Oct. 22, 2018

(86) PCT No.: PCT/KR2018/012414
§ 371 (c)(1),
(2) Date: May 14, 2020

(87) PCT Pub. No.: WO2019/112168
PCT Pub. Date: Jun. 13, 2019

(65) Prior Publication Data
US 2020/0278484 A1    Sep. 3, 2020

(30) Foreign Application Priority Data

Dec. 5, 2017  (KR) ........................ 10-2017-0166241

(51) Int. Cl.
*G02B 5/30*   (2006.01)
*G02B 1/14*   (2015.01)
(Continued)

(52) U.S. Cl.
CPC ............. *G02B 5/3025* (2013.01); *G02B 1/08* (2013.01); *G02B 1/14* (2015.01);
(Continued)

(58) Field of Classification Search
CPC .......... G02B 1/14; G02B 1/08; G02B 5/3033; G02B 5/3025; G02F 1/133528;
(Continued)

(56) References Cited

U.S. PATENT DOCUMENTS

| 2005/0117219 A1* | 6/2005 | Hayashi | ............... G02B 5/3033 |
| | | | 359/487.02 |
| 2009/0040611 A1* | 2/2009 | Kitamura | ............... G02B 1/105 |
| | | | 359/489.2 |
| 2012/0229459 A1* | 9/2012 | Ishiguro | ............ G02F 1/133528 |
| | | | 345/419 |

(Continued)

FOREIGN PATENT DOCUMENTS

| CN | 106257312 A | 12/2016 |
| CN | 107407769 A | 11/2017 |

(Continued)

OTHER PUBLICATIONS

China Office Action from corresponding China Patent Application No. 201880077399.X, China Office Action dated Jul. 29, 2021 (9 pages).

*Primary Examiner* — Sophie Hon
(74) *Attorney, Agent, or Firm* — Lewis Roca Rothgerber Christie LLP

(57) ABSTRACT

A polarizing plate and an optical display comprising the same are disclosed. The polarizing plate includes: a polarizer and a first protective layer stacked on one surface of the polarizer via a bonding layer, wherein the bonding layer is formed of a bonding layer composition including an epoxy compound and a photocationic initiator, and the polarizing plate has a chrominance variation ΔE of 5.2 or less, as calculated by Equation 1.

14 Claims, 1 Drawing Sheet

(51) Int. Cl.
 *G02B 1/08* (2006.01)
 *G02F 1/1335* (2006.01)
 *H01L 27/32* (2006.01)

(52) U.S. Cl.
 CPC .... *G02F 1/133528* (2013.01); *H01L 27/3244* (2013.01); *C09J 2203/318* (2013.01); *C09K 2323/031* (2020.08); *C09K 2323/035* (2020.08); *C09K 2323/055* (2020.08)

(58) Field of Classification Search
 CPC ................ C09J 163/00; C09J 2301/312; C09J 2203/318; C09K 2323/055
 See application file for complete search history.

(56) References Cited

U.S. PATENT DOCUMENTS

2014/0071379 A1* 3/2014 Takahashi ......... G02F 1/134363
 349/62
2016/0054493 A1* 2/2016 Ohira ..................... G02B 5/305
 427/163.1

FOREIGN PATENT DOCUMENTS

| CN | 111448491 B | * | 5/2022 | |
|---|---|---|---|---|
| JP | 2006-178132 A | | 7/2006 | |
| JP | 2007-94396 A | | 4/2007 | |
| JP | 2011-164579 A | | 8/2011 | |
| JP | 2013-109371 A | | 6/2013 | |
| JP | 2013-231785 A | | 11/2013 | |
| KR | 10-2004-0066008 A | | 7/2004 | |
| KR | 10-2009-0010110 A | | 1/2009 | |
| KR | 10-2013-0040227 A | | 4/2013 | |
| KR | 10-2014-0080421 A | | 6/2014 | |
| KR | 10-2016-0038143 A | | 4/2016 | |
| KR | 10-2016-0117722 A | | 10/2016 | |
| KR | 10-2016-0117870 A | | 10/2016 | |
| KR | 20160117870 A | * | 10/2016 | ............... G02B 5/30 |
| KR | 102158872 B1 | * | 9/2020 | |
| TW | 201109746 A | | 3/2011 | |
| WO | WO-2016159645 A1 | * | 10/2016 | ............... B32B 7/12 |

* cited by examiner

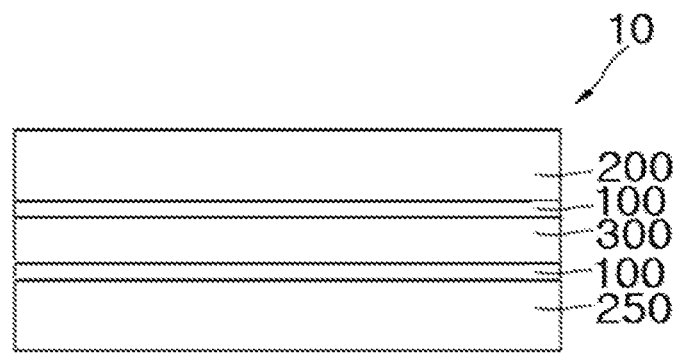

POLARIZING PLATE AND OPTICAL DISPLAY DEVICE COMPRISING SAME

CROSS-REFERENCE TO RELATED APPLICATIONS

This application is a U.S. National Phase Patent Application of International Application Number PCT/KR2018/012414, filed on Oct. 22, 2018, which claims priority to Korean Patent Application Number 10-2017-0166241, filed on Dec. 5, 2017, the entire contents of both of which are incorporated herein by reference.

TECHNICAL FIELD

The present invention relates to a polarizing plate and an optical display including the same. More particularly, the present invention relates to a polarizing plate that has a low chrominance variation, a high degree of polarization, and good light transmittance even after being left under high temperature and/or high temperature/humidity conditions for a long period of time, and an optical display including the same.

BACKGROUND ART

A polarizing plate may include a polarizer and a protective layer stacked on at least one surface of the polarizer. In an optical display, the polarizing plate can be inevitably exposed to high temperature and/or high temperature/humidity conditions for a long period of time. Polarization of the polarizing plate is mainly achieved by the polarizer in the polarizing plate. The polarizer is fabricated by uniaxially stretching an iodine-dyed polyvinyl alcohol film. However, when the polarizing plate is left at high temperature for a long period of time, iodine can be sublimated from the polarizing plate, thereby making it difficult for the polarizing plate to exhibit polarization characteristics thereof.

In order to improve thermal resistance of the polarizing plate, zinc may be added to the polarizer. In this case, however, the polarizing plate can suffer from deterioration in the degree of polarization and light transmittance at high temperature due to migration of zinc atoms to the surface of the polarizer. Alternatively, a crosslinking agent may be added to the polyvinyl alcohol film constituting the polarizer to allow crosslinking of hydroxyl groups in the polyvinyl alcohol film. In this case, however, the stretched polyvinyl alcohol film can suffer from axis distortion, thereby causing deterioration in optical characteristics.

The background technique of the present invention is disclosed in Korean Patent Laid-open Publication No. 2016-0038143 and the like.

DISCLOSURE

Technical Problem

It is one aspect of the present invention to provide a polarizing plate that has good thermal resistance reliability with low chrominance variation even after being left under high temperature and/or high temperature/humidity conditions for a long period of time.

It is another aspect of the present invention to provide a polarizing plate that has good light transmittance and polarization even after being left under high temperature and/or high temperature/humidity conditions for a long period of time.

In accordance with one aspect of the present invention, a polarizing plate includes: a polarizer; and a first protective layer stacked on one surface of the polarizer via a bonding layer, wherein the bonding layer is formed of a bonding layer composition including an epoxy compound and a photocationic initiator, and the polarizing plate has a chrominance variation $\Delta E$ of 5.2 or less, as calculated by Equation 1:

$$\Delta E = [(\Delta L)^2 + (\Delta a^*)^2 + (\Delta b^*)^2]^{1/2} \qquad <\text{Equation 1}>$$

(where $\Delta L$, $\Delta a^*$, and $\Delta b^*$ are the same as defined in the following detailed description of the invention).

In accordance with another aspect of the present invention, an optical display device may include the polarizing plate according to the present invention.

Advantageous Effects

The present invention provides a polarizing plate that has good thermal resistance reliability with low chrominance variation even after being left under high temperature and/or high temperature/humidity conditions for a long period of time.

The present invention provides a polarizing plate that has good light transmittance and polarization even after being left under high temperature and/or high temperature/humidity conditions for a long period of time.

DESCRIPTION OF DRAWINGS

FIG. 1 is a sectional view of a polarizing plate according to one embodiment of the present invention.

BEST MODE

Hereinafter, embodiments of the present invention will be described in detail with reference to the accompanying drawings such that the present invention can be easily realized by a person having ordinary knowledge in the art. It should be understood that the present invention is not limited to the following embodiments and may be embodied in different ways.

Herein, "moisture permeability" of a protective layer is a value measured on the protective layer after the protective layer is left under constant temperature/humidity conditions of 40° C. and 90% RH (relative humidity) for 24 hours. The moisture permeability of the protective layer may be measured in accordance with KS A1013, without being limited thereto.

The inventors of the present invention completed the present invention by confirming that a polarizing plate including a bonding layer on at least one surface of a polarizer has a chrominance variation $\Delta E$ of 5.2 or less, as calculated by Equation 1 after being left under high temperature and/or high temperature/humidity conditions for a long period of time, in which the bonding layer has a pH of 1 to 3 and a storage modulus ratio of 0.25 to 0.60, as calculated by Equation 2. When the chrominance variation $\Delta E$ calculated by Equation 1 is 5.2 or less, the polarizing plate undergoes less yellowing and has improved thermal resistance and reliability even after the polarizing plate is left under high temperature and/or high temperature/humidity conditions for a long period of time. In addition, the bonding layer of the polarizing plate prevents disruption of iodine in the polarizer, thereby securing good thermal resistance reliability with low chrominance variation while reducing variation in light transmittance and polarization degree even after the polarizing plate is left under high temperature and/or high temperature/humidity conditions for a long period of time.

Hereinafter, a polarizing plate according to one embodiment of the present invention will be described.

FIG. 1 is a sectional view of a polarizing plate according to one embodiment of the present invention.

Referring to FIG. 1, a polarizing plate 10 includes a polarizer 300, a first protective layer 200 stacked on one surface of the polarizer 300 via a bonding layer 100, and a second protective layer 250 stacked on the other surface of the polarizer 300 via the bonding layer 100.

The bonding layer 100 may have a pH of 1 to 3, for example, 1, 2, or 3, and a storage modulus ratio of 0.25 to 0.60, for example, 0.25, 0.3, 0.35, 0.4, 0.45, 0.5, 0.55, or 0.6, as calculated by Equation 2. Within these ranges, the polarizing plate can secure a chrominance variation ($\Delta E$) of 5.2 or less, as calculated by Equation 1, thereby improving thermal resistance and reliability under high temperature/humidity conditions.

$$\Delta E=[(\Delta L)^2+(\Delta a^*)^2+(\Delta b^*)^2]^{1/2}, \qquad \text{<Equation 1>}$$

where $\Delta L$ is $L_2-L_1$; $\Delta a^*$ is $(a^*)_2-(a^*)_1$; and $\Delta b^*$ is $(b^*)_2-(b^*)_1$, in which $L_1$ is an L value of an initial polarizing plate; $L_2$ is an L value of the polarizing plate after the polarizing plate is left at 95° C. or 60° C. and 95% RH for 500 hours; $(a^*)_1$ is an a* value of an initial polarizing plate; $(a^*)_2$ is an a* value of the polarizing plate after the polarizing plate is left at 95° C. or 60° C. and 95% RH for 500 hours; $(b^*)_1$ is a b* value of an initial polarizing plate; and $(b^*)_2$ is a b* value of the polarizing plate after the polarizing plate is left at 95° C. or 60° C. and 95% RH for 500 hours. L, a*, and b* of the polarizing plate may be measured using a spectrophotometer (for example: CM-3600A, Konica Minolta Co., Ltd.), but is not limited thereto. Herein, the term "initial polarizing plate" means a polarizing plate before the polarizing plate is left at 95° C. or 60° C. and 95% RH for 500 hours.

$$\text{Storage modulus ratio}=G150/(G100+G150), \qquad \text{<Equation 2>}$$

where G100 is a storage modulus (unit: MPa) of the bonding layer at 100° C. and G150 is a storage modulus (unit: MPa) of the bonding layer at 150° C.

In one embodiment, the bonding layer 100 may have a pH of 1 to 2 and a storage modulus ratio of 0.30 to 0.50, as calculated by Equation 2. In one embodiment, the polarizing plate may have a chrominance variation of 5.0 or less, preferably 4.5 or less, as calculated by Equation 1.

In one embodiment, the polarizing plate may have a polarization degree variation ratio of 1.5% or less, specifically 0.001% to 1.5%, more specifically 0.001% to 1%, as calculated by Equation 3, and a light transmittance variation ratio of 1.5% or less, specifically 0.001% to 1.5%, more specifically 0.001% to 1%, as calculated by Equation 4. Within these ranges, the polarizing plate can exhibit good reliability with low variation of polarization degree and light transmittance even after the polarizing plate is left under high temperature and/or high temperature/humidity conditions for a long period of time.

$$\text{Polarization degree variation ratio}=|P_2-P_1|/P_1\times100 \qquad \text{<Equation 3>}$$

(where $P_1$ is the degree of polarization of an initial polarizing plate and $P_2$ is the degree of polarization of the polarizing plate after the polarizing plate is left at 95° C. or 60° C. and 95% RH for 500 hours).

$$\text{Light transmittance variation ratio}=|T_2-T_1|/T_1\times100 \qquad \text{<Equation 4>}$$

(where $T_1$ is a light transmittance of an initial polarizing plate and $T_2$ is a light transmittance of the polarizing plate after the polarizing plate is left at 95° C. or 60° C. and 95% RH for 500 hours).

In Equations 3 and 4, the degree of polarization and the light transmittance are represented in %. Herein, the term "initial polarizing plate" means a polarizing plate before the polarizing plate is left at 95° C. or 60° C. and 95% RH for 500 hours.

Next, the bonding layer will be described in more detail.

The bonding layer may be formed of a bonding layer composition including an epoxy compound and a photocationic initiator. The bonding layer composition may be a non-(meth)acrylate composition free from a (meth)acrylate compound. If the bonding layer composition further includes a (meth)acrylate compound in the epoxy compound, a polarizing plate including a bonding layer formed of the bonding layer composition can suffer from a significant problem in the chrominance variation represented by Equation 1 when the polarizing plate is left under high temperature or high temperature/humidity conditions for a long period of time.

The epoxy compound may include at least one of an acyclic aliphatic epoxy compound, an alicyclic epoxy compound, an aromatic epoxy compound, and a hydrogenated epoxy compound.

The acyclic aliphatic epoxy compound may include polyglycidyl ethers of linear or branched aliphatic polyhydric alcohols or alkylene oxide adducts thereof. For example, the acyclic aliphatic epoxy compound may include polyglycidyl ethers of polyether polyols obtained by adding one or more alkylene oxides to aliphatic polyhydric alcohols, such as neopentyl glycol diglycidyl ether, diglycidyl ether of 1,4-butanediol, diglycidyl ether of 1,6-hexanediol, triglycidyl ether of glycerin, triglycidyl ether of trimethylolpropane, diglycidyl ether of polyethylene glycol, diglycidyl ether of propylene glycol, ethylene glycol, propylene glycol, or glycerin.

The alicyclic epoxy compound may include at least one of 3,4-epoxycyclohexylmethyl 3,4-epoxycyclohexane carboxylate, 3,4-epoxy-6-methylcyclohexylmethyl 3,4-epoxy-6-methylcyclohexane carboxylate, ethylene bis(3,4-epoxycyclohexane carboxylate), bis(3,4-epoxycyclohexylmethyl) adipate, diethylene glycol bis(3,4-epoxycyclohexylmethyl ether), ethylene glycol bis(3,4-epoxycyclohexylmethyl ether), 2,3,14,15-diepoxy-7,11,18,21-tetraoxaspiro[5.2.2.5.2.2]heneicosane, 3-(3,4-epoxycyclohexyl)-8,9-epoxy-1,5-dioxaspiro[5.5]undecane, 4-vinylcyclohexene dioxide, limonene dioxide, bis(2,3-epoxycyclopentyl) ether, and dicyclopentadiene dioxide.

The aromatic epoxy compound may include at least one of bisphenol type diglycidyl ethers, such as diglycidyl ether of bisphenol A, diglycidyl ether of bisphenol F, and diglycidyl ether of bisphenol S; novolac type epoxy resins, such as phenol novolac epoxy resins, cresol novolac epoxy resins, and hydroxybenzaldehyde phenol novolac epoxy resins; and polyfunctional epoxy resins, such as glycidyl ether of tetrahydroxydiphenylmethane, glycidyl ether of tetrahydroxybenzophenone, and epoxylated polyvinyl phenol.

The hydrogenated epoxy compound refers to a resin obtained by selective hydrogenation of an aromatic epoxy compound in the presence of a catalyst under pressure. Examples of the aromatic epoxy compound may include bisphenol type epoxy resins, such as diglycidyl ether of bisphenol A, diglycidyl ether of bisphenol F, and diglycidyl ether of bisphenol S; novolac type epoxy resins, such as phenol novolac epoxy resins, cresol novolac epoxy resins, and hydroxybenzaldehyde phenol novolac epoxy resins; and polyfunctional epoxy resins, such as glycidyl ether of tetrahydroxydiphenylmethane, glycidyl ether of tetrahydroxybenzophenone, epoxylated polyvinyl phenol, and the like.

Preferably, the epoxy compound includes a mixture of the aromatic epoxy compound and the acyclic aliphatic epoxy compound. More preferably, the epoxy compound includes bisphenol diglycidyl ether and diglycidyl ether of a branched aliphatic polyhydric alcohol.

The photocationic initiator may be selected from any typical photocationic initiator well-known to those skilled in the art. Specifically, the photocationic initiator may include onium salts containing a cation and an anion. Examples of the cation may include diaryliodonium, such as diphenyliodonium, 4-methoxydiphenyliodonium, bis(4-methylphenyl)iodonium, bis(4-tert-butylphenyl)iodonium, bis(dodecylphenyl)iodonium, and (4-methylphenyl)[(4-(2-methylpropyl)phenyl)iodonium; triarylsulfonium, such as triphenylsulfonium and diphenyl-4-thiophenoxyphenyl sulfonium; bis[4-(diphenyl sulfonio)phenyl]sulfide, and the like. Examples of the anion may include hexafluorophosphate ($PF_6^-$), tetrafluoroborate ($BF_4^-$), hexafluoroantimonate ($SbF_6^-$), hexafluoroarsenate ($AsF_6^-$), hexachloroantimonate ($SbCl_6^-$), and the like.

The bonding layer composition may further include an oxetane compound.

The oxetane compound may include at least one of 3,7-bis(3-oxetanyl)-5-oxa-nonane, 1,4-bis[(3-ethyl-3-oxetanylmethoxy)methyl]benzene, 1,2-bis[(3-ethyl-3-oxetanylmethoxy)methyl]ethane, 1,3-bis[(3-ethyl-3-oxetanylmethoxy)methyl]propane, ethylene glycol bis(3-ethyl-3-oxetanylmethyl) ether, triethylene glycol bis(3-ethyl-3-oxetanylmethyl) ether, tetraethylene glycol bis(3-ethyl-3-oxetanylmethyl) ether, 1,4-bis(3-ethyl-3-oxetanylmethoxy) butane, 1,6-bis(3-ethyl-3-oxetanylmethoxy)hexane, 3-ethyl-3-[(phenoxy)methyl]oxetane, 3-ethyl-3-(hexyloxymethyl) oxetane, 3-ethyl-3-(2-ethylhexyloxymethyl)oxetane, 3-ethyl-3-(hydroxymethyl)oxetane, 3-ethyl-3-(chloromethyl)oxetane, and (3-ethyl-3[[(3-ethyloxetane-3-yl) methoxy]methyl]oxetane, without being limited thereto.

In one embodiment, the bonding layer composition may include 50% by weight (wt %) to 80 wt % of the epoxy compound, 10 wt % to 40 wt % of the oxetane compound, and 1 wt % to 10 wt % of the photocationic initiator in terms of solid content. Within this content ranges of the components, the bonding layer can secure good bonding strength, a pH of 1 to 3, a storage modulus ratio of 0.25 to 0.60, and a chrominance variation ($\Delta E$) of 5.2 or less, thereby improving thermal resistance and reliability under high temperature/humidity conditions.

In another embodiment, the bonding layer composition may include 30 wt % to 70 wt % of the aromatic epoxy compound, 10 wt % to 50 wt % of the acyclic aliphatic epoxy compound, 10 wt % to 40 wt % of the oxetane compound, and 1 wt % to 10 wt % of the photocationic initiator in terms of solid content. Within these content ranges of the components, the bonding layer can secure good bonding strength, a pH of 1 to 3, a storage modulus ratio of 0.25 to 0.60, a chrominance variation ($\Delta E$) of 5.2 or less, thereby improving thermal resistance and reliability under high temperature/humidity conditions.

The bonding layer composition may further include typical additives, such as a photosensitizer, an antioxidant, a dispersant, and the like.

The bonding layer may have a thickness of 0.1 μm to 10 μm. Within this thickness range, the bonding layer can be used in an optical display.

Polarizer

The polarizer 300 polarizes external light to reach the first protective layer 200 therethrough, thereby improving visibility when applied to an optical display.

The polarizer 300 may include a typical polarizer formed of a polyvinyl alcohol film. For example, the polarizer may include a polyvinyl alcohol-based polarizer obtained by dyeing a polyvinyl alcohol film with iodine and the like, or a polyene-based polarizer obtained by dehydrating the polyvinyl alcohol film. In one embodiment, the polarizer may include a non-zinc polarizer free from zinc. The polarizer 300 may have a thickness of 5 μm to 50 μm. Within this thickness range, the polarizer may be used in an optical display.

First Protective Layer

The first protective layer 200 may be formed on one surface (light exit surface) of the polarizer 300 to protect the polarizer 300 while improving mechanical strength of the polarizing plate. The first protective layer 200 may include at least one of an optically transparent protective film and an optically transparent protective coating layer.

When the first protective layer 200 is a protective film, the first protective layer 200 may include a protective film formed of an optically transparent resin. The protective film may be formed through melting and extrusion of the resin. The resin may be further subjected to stretching, as needed. The optically transparent resin may include at least one selected from cellulose ester resins including triacetylcellulose, cyclic polyolefin resins including amorphous cyclic olefin polymer (COP), polycarbonate resins, polyester resins including polyethylene terephthalate (PET), polyether sulfone resins, polysulfone resins, polyamide resins, polyimide resins, non-cyclic polyolefin resins, polyacrylate resins including poly(methyl methacrylate), polyvinyl alcohol resins, polyvinyl chloride resins, and polyvinylidene chloride resins.

When the first protective layer 200 is a protective coating layer, the protective coating layer can improve adherence to the polarizer, transparency, mechanical strength, thermal stability, moisture shielding, and durability of the first protective layer 200. In one embodiment, the protective coating layer for the first protective layer 200 may be formed of an actinic radiation-curable resin composition including an actinic radiation-curable compound and a polymerization initiator. The actinic radiation-curable compound may include at least one of a cationic polymerizable curable compound, a radical polymerizable curable compound, a urethane resin, and a silicone resin. The cationic polymerizable curable compound may be an epoxy compound having at least one epoxy group therein, or an oxetane compound having at least one oxetane ring therein. The radical polymerizable curable compound may be a (meth) acrylic compound having at least one (meth)acryloyloxy group therein.

The first protective layer 200 may have a thickness of 5 μm to 200 μm, specifically 30 μm to 120 μm. The first protective layer 200 of a protective film type may have a thickness of 50 μm to 100 μm and the first protective layer 200 of a protective coating layer type may have a thickness of 5 μm to 50 μm.

In one embodiment, the first protective layer may have a moisture permeation of 500 g/m²·24 hr or more, preferably 700 g/m²·24 hr to 2,000 g/m²·24 hr. Within this range, the polarizing plate can have a further reduced chrominance variation of Equation 1 under high temperature and/or high temperature/humidity conditions. For example, the first protective layer may include a film formed of a cellulose ester resin including triacetylcellulose, a polycarbonate resin, and the like.

In another embodiment, the first protective layer may have a moisture permeation of 100 g/m²·24 hr or less, preferably 50 g/m²·24 hr or less, more preferably 20 g/m²·24 hr or less. Within this range, the polarizing plate can have a further reduced chrominance variation of Equation 1 under high temperature and/or high temperature/humidity conditions. For example, the first protective layer may include a film formed of a cyclic polyolefin resin including an amorphous cyclic olefin polymer, a polyester resin including polyethylene terephthalate, and the like.

Although not shown in FIG. 1, the polarizing plate may further include a functional coating layer, for example, a hard coating layer, an anti-fingerprint layer, or an anti-reflective layer on an upper surface of the first protective layer 200.

Second Protective Layer

The second protective layer 250 may be formed on the other surface (light incidence surface) of the polarizer 300 to protect the polarizer 300 while improving mechanical strength of the polarizing plate.

The second protective layer 250 may be formed of the same composition as or a different composition from the first protective layer 200. The second protective layer 250 may have the same thickness as or a different thickness from the first protective layer 200. The second protective layer 250 may have the same or different moisture permeation from the first protective layer 200.

Preferably, in the polarizing plate, one of the first protective layer and the second protective layer has higher moisture permeation than the other. In this case, the polarizing plate including the bonding layer according to the present invention can reduce chrominance variation even after the polarizing plate is left under high temperature or high temperature/humidity conditions. In one embodiment, one of the first protective layer and the second protective layer may have a moisture permeation of 500 g/m²·24 hr or more, preferably 700 g/m²·24 hr to 2,000 g/m²·24 hr, and the other protective layer may have a moisture permeation of 100 g/m²·24 hr or less, preferably 50 g/m²·24 hr or less, more preferably 20 g/m²·24 hr or less. Within this range, the polarizing plate can further reduce the chrominance variation of Equation 1 even after the polarizing plate is left under high temperature or high temperature/humidity conditions.

Although not shown in FIG. 1, the polarizing plate may further include an adhesive layer formed on the other surface of the second protective layer 250 to attach the polarizing plate to an adherend (for example, a liquid crystal panel, a light emitting device panel, such as an organic light emitting device panel, and the like) therethrough. The adhesive layer may be formed of typical adhesives, such as pressure sensitive adhesives (PSA), without being limited thereto.

Although FIG. 1 shows the polarizing plate including identical bonding layers formed on both surfaces of the polarizer, a bonding layer formed on one surface of the polarizer may be different from another bonding layer formed on the other surface of the polarizer in terms of thickness, composition, pH and/or storage modulus ratio. In one example, a bonding layer formed of the bonding layer composition according to the present invention may be formed on one surface of the polarizer and a bonding layer having a pH value or a storage modulus ratio out of the numerical range according to the present invention may be formed on the other surface thereof.

Next, a polarizing plate according to another embodiment of the present invention will be described.

The polarizing plate according to this embodiment is substantially the same as the polarizing plate according to the above embodiment except that the polarizing plate includes a zinc-based polarizer containing zinc. The following description will focus on the polarizer of the polarizing plate according to this embodiment.

The polarizer according to this embodiment may contain zinc. In the polarizer, zinc has a heat blocking function to prevent external heat from being transferred into the polarizer and forms a chelate together with a hydroxyl group of the polyvinyl alcohol film forming the polarizer to prevent sublimation of $I^{5-}$ or $I^{3-}$ ions, thereby further improving thermal resistance of the polarizer.

Zinc may be included in the polarizer in the form of zinc metal. Alternatively, zinc may be included in the form of a zinc compound. The zinc compound may be contained in at least one of a zinc unsaturated or saturated carboxylate including a zinc metal salt, zinc oxide, zinc (meth)acrylate, and the like. The zinc metal salt may include zinc and magnesium, calcium, barium, and the like, without being limited thereto.

Zinc or the zinc compound may be introduced into the polarizer by adding the zinc or the zinc compound to a dyeing, stretching, boric acid, crosslinking, or color complementation bath during manufacture of the polarizer. Alternatively, zinc or the zinc compounds may be introduced into the polarizer through zinc impregnation after dyeing, stretching, or boric acid treatment.

Next, an optical display according to the present invention will be described.

The optical display according to the present invention may include the polarizing plate according to the present invention. The optical display may include at least one of a liquid crystal display and a light emitting device display. For the light emitting device display, the light emitting device includes an organic or inorganic light emitting device and may mean an organic or inorganic light emitting device and can mean a light emitting diode (LED), an organic light emitting diode (OLED), a quantum dot light emitting diode (QLED), and other devices including light emitting materials such as phosphors.

Next, the constitution and effects of the present invention will be described in more detail with reference to some examples. It should be understood that these examples are provided for illustration only and are not to be construed in any way as limiting the present invention.

Details of components used in the following Examples and Comparative Examples are as follows.

Preparative Example 1

Manufacture of Polarizer

A polyvinyl alcohol film (VF-PS6000, Kuraray Co., Ltd., thickness: 60 μm) washed with water at 25° C. was subjected to swelling in a swelling bath filled with water at 30° C. Then, the swollen film was dyed in a dyeing bath filled with an aqueous solution containing 1 ml/mol of potassium iodide at 30° C. for 65 seconds. The dyed film was allowed to pass through a wet crosslinking bath filled with an aqueous solution containing 3 wt % of boric acid at 30° C. Thereafter, the film was stretched to 6 times an initial length thereof in an aqueous solution containing 3 wt % of boric acid at 65° C. The stretched film was subjected to color complementation in a color complementation bath filled with an aqueous solution containing 4.5 wt % of potassium iodide at 30° C. for 10 seconds or less. Then, the film was washed and dried, thereby providing a polarizer (thickness: 22 μm, not containing zinc).

Preparative Example 2

Manufacture of Polarizer

A polyvinyl alcohol film (VF-PS6000, Kuraray Co., Ltd., thickness: 60 μm) washed with water at 25° C. was subjected to swelling in a swelling bath filled with water at 30° C. Then, the swollen film was dyed in a dyeing bath filled with an aqueous solution containing 1 ml/mol of potassium iodide at 30° C. for 65 seconds. The dyed film was allowed to pass through a wet crosslinking bath filled with an aqueous solution containing 3 wt % of boric acid at 30° C. Thereafter, the film was stretched to 6 times an initial length thereof in an aqueous solution containing 3 wt % of boric acid at 65° C. The stretched film was subjected to color complementation in a color complementation bath filled with an aqueous solution containing 4.5 wt % of potassium iodide and 2 wt % of zinc sulfate at 30° C. for 10 seconds or less. Then, the film was washed and dried, thereby providing a polarizer (thickness: 22 μm).

(1) Polarizer: Polarizers of Preparative Examples 1 and 2

(2) Protective layer: Polyethylene terephthalate (PET) film (moisture permeation: 8 g/m$^2$19 24 hr, thickness: 80 μm, COSMOSHINE, Toyobo Co., Ltd.)

(3) Protective layer: Triacetylcellulose (TAC) film (moisture permeation: 800 g/m$^2$19 24 hr, thickness: 80 μm, FujiTAC, Fuiji Co., Ltd.)

(4) Protective layer: Cycloolefin polymer (COP) film (moisture permeation: 5 g/m$^2$19 24 hr, thickness: 80 μm, ZEONOR, Zeon Co., Ltd.)

(5) Bonding agent 1: KRX-4024 (ADEKA Co., Ltd.) (comprising 40 wt % of bisphenol A diglycidyl ether, 30 wt % of neopentyl glycol diglycidyl ether, 23 wt % of (3-ethyl-3[[(3-ethyloxetane-3-yl)methoxy]methyl]oxetane), and 7 wt % of an initiator)

(6) Bonding agent 2: A bonding agent composition comprising 65 parts by weight of cycloaliphatic diepoxide (CELLOXIDE 2021P, Daicel Co., Ltd.), 5 parts by weight of phenyl glycidyl ether (EX-141, Nagase Co., Ltd.), 20 parts by weight of tri(propylene glycol) diacrylate (M-220, Miwon Specialty Chemical Co., Ltd.), 10 parts by weight of lauryl acrylate (M-120, Miwon Specialty Chemical Co., Ltd.), 2 parts by weight of diphenyl-4-(phenylthio)phenyl sulfonium hexafluorophosphate (CPI-100P, San-Apro Co., Ltd.), and 1 part by weight of 1-hydroxy-cyclohexylphenylketone (Irgacure-184, BASF Co., Ltd.).

(7) Bonding agent 3: A bonding agent composition comprising 49 parts by weight of bisphenol A aromatic epoxy (KDS-8128, Kukdo Chemical Co., Ltd.), 48 parts by weight of 2-hydroxyethyl acrylate (100%, SK CYTEC Co., Ltd.), 2 parts by weight of thioxanthone (DETX-S, Nippon Kayaku Co., Ltd.), and 1 part by weight of hexafluorophosphate (Irgacure-250, BASF Co., Ltd.).

The bonding agents 1 to 3 were evaluated as to properties listed in Table 1.

(1) pH of bonding layer: 1 g of a bonding agent composition was applied to a release film and subjected to photocuring at 25° C. and 60% RH using a metal halide lamp under conditions of 400 mW/cm$^2$ and 1,000 mJ/cm$^2$, thereby forming a 10 μm thick bonding layer. A specimen prepared by attaching a pH meter (pH paper) to the bonding layer was left in a chamber at 105° C. for 500 hours to measure pH of the specimen based on color variation of the pH meter.

(2) Storage modulus of bonding layer: 1 g of a bonding agent composition was applied to a release film and subjected to photocuring at a temperature of 25° C. and 60% RH using a metal halide lamp under conditions of 400 mW/cm$^2$ and 1,000 mJ/cm$^2$, thereby forming a 10 μm thick bonding layer. Storage modulus of the prepared specimen was measured using a DMA Q800 (TA instrument Co., Ltd.) under conditions of strain 0.03%, normal force 100N, and 1 Hz while increasing the temperature from −20° C. to 200° C. at a rate of 5° C./min. Storage modulus was measured at 100° C. and at 150° C.

TABLE 1

|  | Bonding agent 1 | Bonding agent 2 | Bonding agent 3 |
| --- | --- | --- | --- |
| pH of bonding layer | 1~2 | 2~3 | 4~5 |
| Storage modulus@100° C. (MPa) | 229 | 698 | 87 |
| Storage modulus@150° C. (MPa) | 114 | 22 | 24 |
| Storage modulus ratio of Equation 2 | 0.33 | 0.03 | 0.22 |

Example 1

A PET film was bonded to one surface of the polarizer prepared in Preparative Example 1 using the bonding agent 1 (first bonding layer, thickness: 2 μm). Then, a TAC film was bonded to the other surface of the polarizer prepared in Preparative Example 1 using the bonding agent 1 (second bonding layer, thickness: 2 μm). Then, an acrylic adhesive layer was formed on the other surface of the TAC film, thereby preparing a polarizing plate.

Examples 2 to 6

Each of polarizing plates was prepared in the same manner as in Example 1 except that the kind of polarizer and the kind of protective layer were changed as listed in Table 2.

Comparative Examples 1 to 4

Each of polarizing plates was prepared in the same manner as in Example 1 except that the kind of polarizer and the kind of protective layer were changed as listed in Table 3.

The polarizing plates of Examples and Comparative Examples were evaluated as to the following properties and evaluations results are shown in Tables 2 and 3.

(1) Chrominance variation (ΔE): L, a*, and b* values of each polarizing plate were measured using a spectrophotometer (CM-3600A, Konica Minolta Co., Ltd.). Then, the polarizing plate was left at 95° C. for 500 hours, followed by measuring L, a* and b* values in the same manner. Then, chrominance variation ΔE was calculated using the measured L, a* and b* values according to Equation 1.

(2) Degree of polarization: The degree of polarization of each polarizing plate was measured using a V7100 (JASCO Co., Ltd.) at a wavelength of 380 nm to 780 nm before and after the polarizing plate was left at 95° C. for 500 hours.

(3) Light transmittance: Light transmittance of each polarizing plate was measured using a V7100 (JASCO Co., Ltd.)

at a wavelength of 380 nm to 780 nm before and after the polarizing plate was left at 95° C. for 500 hours.

TABLE 2

| | Example | | | | | |
|---|---|---|---|---|---|---|
| | 1 | 2 | 3 | 4 | 5 | 6 |
| First protective layer | PET | PET | PET | TAC | TAC | TAC |
| First bonding layer | bonding agent 1 | bonding agent 1 | bonding agent 1 | bonding agent 1 | bonding agent 1 | bonding agent 1 |
| Polarizer | Preparative Example 1 | Preparative Example 2 | Preparative Example 2 | Preparative Example 2 | Preparative Example 1 | Preparative Example 2 |
| Second bonding layer | Bonding agent 1 | Bonding agent 1 | Bonding agent 1 | Bonding agent 1 | Bonding agent 1 | Bonding agent 1 |
| Second protective layer | TAC | TAC | COP | COP | TAC | TAC |
| ΔE | 3.5 | 2.8 | 2.9 | 3.2 | 5.0 | 4.7 |
| Degree of polarization (%) Before being left | 99.995 | 99.994 | 99.994 | 99.994 | 99.995 | 99.994 |
| Degree of polarization (%) After being left | 99.965 | 99.990 | 99.988 | 99.981 | 99.914 | 99.927 |
| Light transmittance (%) Before being left | 41.7 | 41.7 | 41.7 | 41.7 | 41.7 | 41.7 |
| Light transmittance (%) After being left | 41.5 | 41.6 | 41.5 | 41.5 | 41.2 | 41.3 |

TABLE 3

| | Comparative Example | | | |
|---|---|---|---|---|
| | 1 | 2 | 3 | 4 |
| First protective layer | PET | PET | TAC | TAC |
| First bonding layer | bonding agent 2 | bonding agent 2 | bonding agent 3 | bonding agent 3 |
| Polarizer | Preparative Example 1 | Preparative Example 2 | Preparative Example 1 | Preparative Example 2 |
| Second bonding layer | Bonding agent 2 | Bonding agent 2 | Bonding agent 3 | Bonding agent 3 |
| Second protective layer | TAC | TAC | TAC | TAC |
| ΔE | 20.5 | 17.6 | 15.2 | 13.9 |
| Degree of polarization (%) Before being left | 99.994 | 99.995 | 99.995 | 99.995 |
| Degree of polarization (%) After being left | 96.597 | 97.023 | 97.287 | 98.004 |
| Light transmittance (%) Before being left | 41.7 | 41.7 | 41.7 | 41.7 |
| Light transmittance (%) After being left | 10.5 | 13.7 | 15.6 | 20.4 |

As shown in Table 2, the polarizing plates according to the present invention had a low chrominance variation to exhibit good thermal resistance reliability and good light transmittance and polarization degree even after being left under high temperature or high temperature/humidity conditions for a long period of time.

On the contrary, the polarizing plates of Comparative Examples 1 and 2, which were prepared without a bonding layer, had a high chrominance variation and suffered from deterioration in the degree of polarization and light transmittance after being left under high temperature or high temperature/humidity conditions for a long period of time.

It should be understood that various modifications, changes, alterations, and equivalent embodiments can be made by those skilled in the art without departing from the spirit and scope of the invention.

The invention claimed is:

1. A polarizing plate comprising:
a polarizer; and
a first protective layer stacked on a first surface of the polarizer via a first bonding layer,
wherein the first bonding layer has a pH of 1 to 3 and is formed of a bonding layer composition comprising an epoxy compound and a photocationic initiator, and the polarizing plate has a chrominance variation ΔE of 5.2 or less, as calculated by Equation 1:

$$\Delta E = [(\Delta L)^2 + (\Delta a^*)^2 + (\Delta b^*)^2]^{1/2}, \quad \text{<Equation 1>}$$

where $\Delta L$ is $L_2 - L_1$; $\Delta a^*$ is $(a^*)_2 - (a^*)_1$; and $\Delta b^*$ is $(b^*)_2 - (b^*)_1$, in which $L_1$ is an L value of the polarizing plate before the polarizing plate is left at 95° C. or 60° C. and 95% RH for 500 hours; $L_2$ is an L value of the polarizing plate after the polarizing plate is left at 95° C. or 60° C. and 95% RH for 500 hours; $(a^*)_1$ is an a* value of the polarizing plate before the polarizing plate is left at 95° C. or 60° C. and 95% RH for 500 hours; $(a^*)_2$ is an a* value of the polarizing plate after the polarizing plate is left at 95° C. or 60° C. and 95% RH for 500 hours; $(b^*)_1$ is a b* value of the polarizing plate before the polarizing plate is left at 95° C. or 60° C. and 95% RH for 500 hours; and $(b^*)_2$ is a b* value of the polarizing plate after the polarizing plate is left at 95° C. or 60° C. and 95% RH for 500 hours, and wherein the polarizing plate has a light transmittance variation ratio of 1.5% or less, as calculated by Equation 4:

Light transmittance variation ratio=$|T_2-T_1|/T_1 \times 100$,   <Equation 4> where $T_1$ is a light transmittance of the polarizing plate measured at a wavelength of 380 nm to 780 nm before the polarizing plate is left at 95° C. or 60° C. and 95% RH for 500 hours, and $T_2$ is a light transmittance of the polarizing plate measured at a wavelength of 380 nm to 780 nm after the polarizing plate is left at 95° C. or 60° C. and 95% RH for 500 hours.

2. The polarizing plate according to claim 1, wherein the bonding layer composition is a non-(meth)acrylate composition.

3. The polarizing plate according to claim 1, wherein the epoxy compound comprises a mixture of an aromatic epoxy compound and an acyclic aliphatic epoxy compound.

4. The polarizing plate according to claim 1, wherein the bonding layer composition further comprises an oxetane compound.

5. The polarizing plate according to claim 1, wherein the bonding layer composition comprises 30 wt % to 70 wt % of an aromatic epoxy compound, 10 wt % to 50 wt % of an acyclic aliphatic epoxy compound, 10 wt % to 40 wt % of an oxetane compound, and 1 wt % to 10 wt % of a photocationic initiator in terms of solid content.

6. The polarizing plate according to claim 1, wherein the bonding layer composition further comprises a photosensitizer.

7. The polarizing plate according to claim 1, wherein the polarizer is free from zinc.

8. The polarizing plate according to claim 1, wherein the polarizer contains zinc.

9. The polarizing plate according to claim 1, further comprising: a second protective layer formed on a second surface of the polarizer.

10. The polarizing plate according to claim 9, wherein the first protective layer has a moisture permeation of 500 g/m²·24 hr or more and the second protective layer has a moisture permeation of 100 g/m²·24 hr or less.

11. The polarizing plate according to claim 9, wherein the second protective layer is formed on the second surface of the polarizer via a second bonding layer.

12. The polarizing plate according to claim 11, wherein the second bonding layer is formed of the bonding layer composition.

13. An optical display device comprising the polarizing plate according to claim 1.

14. A polarizing plate comprising:
a polarizer; and
a first protective layer stacked on a first surface of the polarizer via a first bonding layer,
wherein the first bonding layer is formed of a bonding layer composition comprising an epoxy compound and a photocationic initiator, and the polarizing plate has a chrominance variation ΔE of 5.2 or less, as calculated by Equation 1:

$$\Delta E = [(\Delta L)^2 + (\Delta a^*)^2 + (\Delta b^*)^2]^{1/2}, \quad \text{<Equation 1>}$$

where $\Delta L$ is $L_2 - L_1$, $\Delta a^*$ is $(a^*)_2 - (a^*)_1$; and $\Delta b^*$ is $(b^*)_2 - (b^*)_1$, in which $L_1$ is an L value of the polarizing plate before the polarizing plate is left at 95° C. or 60° C. and 95% RH for 500 hours; $L_2$ is an L value of the polarizing plate after the polarizing plate is left at 95° C. or 60° C. and 95% RH for 500 hours; $(a^*)_1$ is an a* value of the polarizing plate before the polarizing plate is left at 95° C. or 60° C. and 95% RH for 500 hours; $(a^*)_2$ is an a* value of the polarizing plate after the polarizing plate is left at 95° C. or 60° C. and 95% RH for 500 hours; $(b^*)_1$ is a b* value of the polarizing plate before the polarizing plate is left at 95° C. or 60° C. and 95% RH for 500 hours; and $(b^*)_2$ is a b* value of the polarizing plate after the polarizing plate is left at 95° C. or 60° C. and 95% RH for 500 hours, and wherein the first bonding layer has a pH of 1 to 3 and a storage modulus ratio of 0.25 to 0.60, as calculated by Equation 2:

$$\text{Storage modulus ratio} = G150/(G100+G150), \quad \text{<Equation 2>}$$

where G100 is a storage modulus (unit: MPa) of the first bonding layer at 100° C. and G150 is a storage modulus (unit: MPa) of the first bonding layer at 150° C.

\* \* \* \* \*